Aug. 16, 1932.  J. E. HESTER  1,872,289
TOY VEHICLE
Filed May 1, 1931

Inventor:
JAMES E. HESTER,
John E. Jackson
his Attorney.

Patented Aug. 16, 1932

1,872,289

UNITED STATES PATENT OFFICE

JAMES E. HESTER, OF PITTSBURGH, PENNSYLVANIA

TOY VEHICLE

Application filed May 1, 1931. Serial No. 534,258.

This invention relates to vehicles and more particularly to toy vehicles and has for one of its objects the provision of a novel front wheel drive unit for such vehicles.

Another object is to provide a vehicle of this class with a drive unit adapted to be detachably connected to various designs of body units.

A further object is to provide a novel construction of hand propelled drive unit in which the hand operating lever may be readily shifted from operating to free position to permit coasting.

A still further object is to provide a drive unit in which the drive wheels are mounted so as to have a limited rotation relative to each other.

In the drawing—

Figure 1:
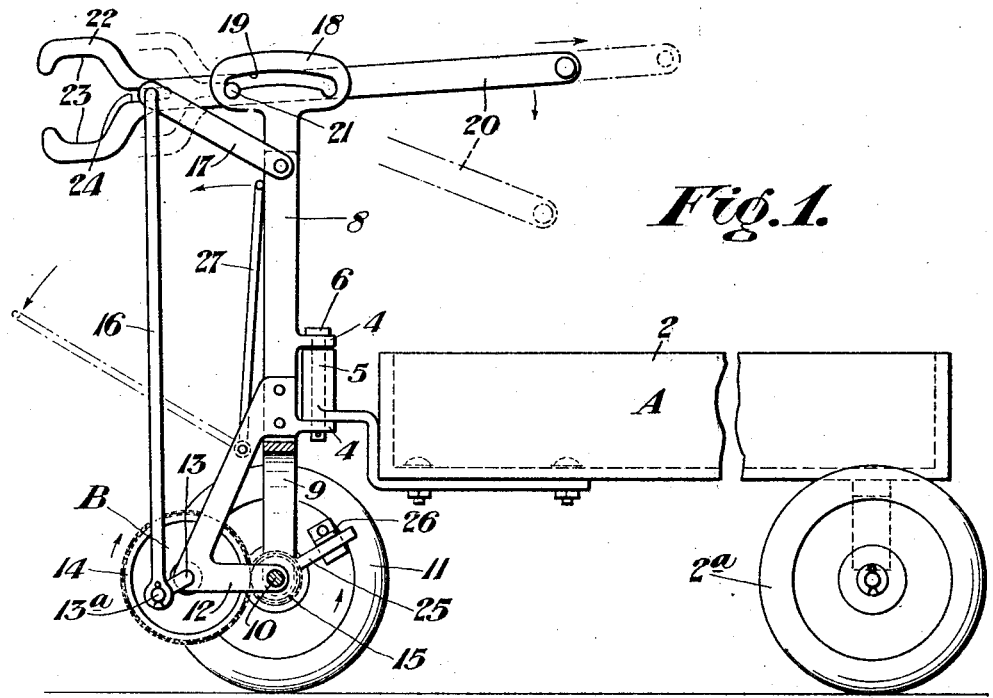
Figure 1 is a side elevation of a vehicle embodying this invention.
Figure 2:
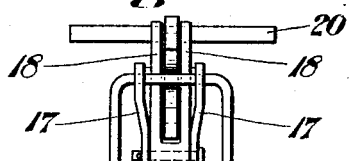
Figure 2 is a front elevation thereof.
Figure 3:
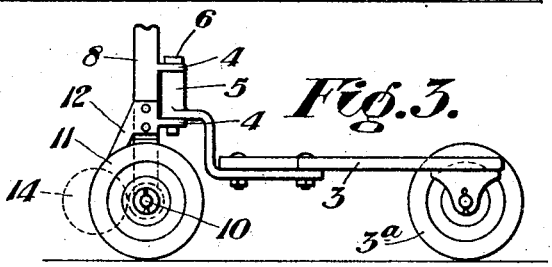
Figure 3 is a side elevation of a modified form of vehicle.
Figure 4:
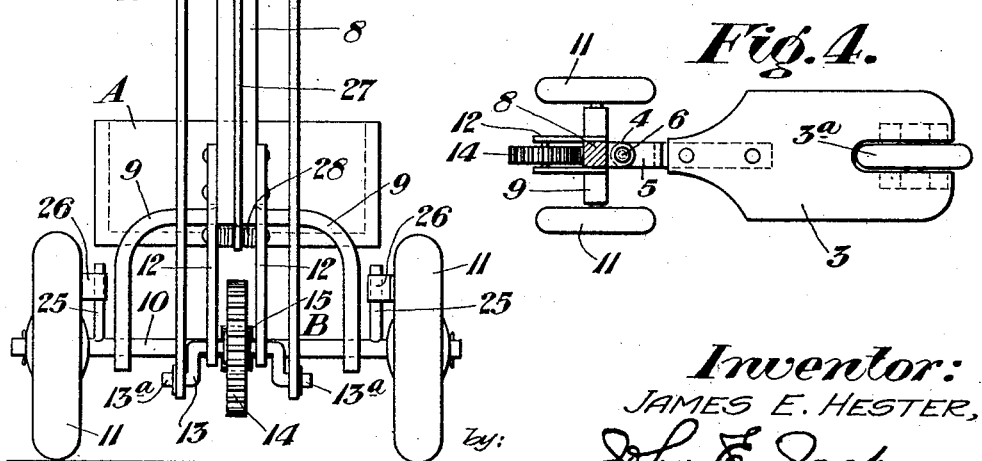
Figure 4 is a plan view of the vehicle of Figure 3.

Referring more particularly to the drawing the letter B designates the body unit which may be in the form of a wagon body 2 having a pair of rear wheels 2a as shown in Figure 1 or in the form of a "scooter" platform 3, having a single rear wheel 3a as shown in Figures 3 and 4.

The letter B designates the front wheel drive unit as a whole. The drive unit is provided with a pair of coupler jaws 4 adapted to receive tongues 5 carried by the body units and a pivot or king pin 6 is adapted to be passed through registered apertures in said jaws and tongue to couple the body unit A and front wheel drive unit B together.

The front wheel drive unit comprises a supporting structure composed of a vertically disposed post 8, a pair of transversely extending brackets 9 in which an axle 10 is journaled, and spaced brackets 12 in which a crank shaft 13 is journaled. The brackets 12 are secured to the post 8 and the axle 10.

A power gear 14 is secured to the crank shaft 13 and is meshed with a pinion 15 on the axle 10, which also has traction wheels 11 journaled thereon.

The crank shaft 12 is provided with parallel cranks 13a at each end and beyond the brackets 12 and an inverted U-shaped connecting rod member 16 has the ends of its arms connected to said cranks 13a and has its upper or closed end pivotally mounted in the forward ends of bracket arms 17 pivotally secured to the post 8 adjacent the upper end thereof and projecting forwardly therefrom.

The upper end of the post 8 is provided with transversely spaced plates 18 having elongated curved slots 19 therein. A hand operated rocking lever 20 is positioned between the plates 18 and is provided with a fulcrum pin 21 which is mounted for pivotal and sliding movement in the slots 19. The forward end of said rocking lever is provided with a drive head 22 which has a forwardly and vertically flaring opening 23 therein which terminates at its rear end in a slot 24. The width or vertical dimension of the opening 23 adjacent its forward end is slightly greater than the maximum stroke of the connecting rod member 16.

The traction wheels 11 which are journaled on the axle 10 are adapted to receive power from the axle 10 through power arms 25 secured to the axle and adapted to engage lugs 26 carried by the inner side faces of the wheels 11.

A tongue 27 is pivotally connected to the brackets 12 and held normally in vertical position by a spring 28. If at any time the operator desires to pull the vehicle he may lower the tongue 27 and pull the vehicle in the manner usual with toy wagons, etc.

In operation, after one of the bodies A is secured to the power unit B, the operator will position himself in or on the vehicle body A, and after making sure that the rocking lever 20 is in its forwardmost position so that the closed end of the connecting rod member 16 is located in the slot 24 of the drive head 22, he will proceed to rock the lever 20. Rocking of the lever 20 will reciprocate the connecting rod member 16 and revolve the crank shaft 13. As the crank shaft 13 is revolved the gear 14 will operate the pinion 15 on the axle 10 thereby rotating said axle and causing the arms 25 to engage the lugs 26 on the wheels 11 and rotate said wheels.

If the operator wishes to coast without rocking the lever 20 he need only to move the lever to its rearmost position whereupon the closed end of the connecting rod member 16 will be in the flared opening 23 of the head 22 and will be free to reciprocate relative to the lever. When the operator wishes to again manually operate the vehicle he need only to shift the lever 20 forwardly until the closed end of the connecting rod is again engaged in the slot 24. This shifting of the lever 20 may be accomplished while the vehicle is in motion if desired.

When it is desired to retard the movement of the vehicle it is only necessary to retard the rocking movement of the lever 20 thereby causing the lugs 26 on the wheels 11 to engage the opposite sides of the arms 25 than are engaged during the driving of said vehicle and tend to drive the axle 10.

When turning the vehicle the wheels 11 may rotate relative to each other within a limit of one complete revolution due to the free drive connection formed by the arms 25 and lugs 26.

The vehicle is steered by the lever 20 which when force is applied sidewise will cause the drive unit B to rotate about the king pin 6.

While I have shown and described one specific embodiment of my invention it will be understood that I do not wish to be limited thereto since various modifications may be made without departing from the scope of my invention as defined in the appended claims.

I claim:

1. A toy vehicle comprising a wheeled body unit and a self contained hand propelled front wheel drive unit pivotally connected to said body unit, said drive unit comprising a supporting structure including a post, an axle journaled in said structure, a crank power shaft journaled in said structure, a gear on said crank shaft, a pinion on said axle and meshed with said gear, a hand operated rocking lever mounted at the upper end of said post, for a rocking movement about a movable fulcrum point, said fulcrum point being movable back and forth in a direction parallel with the longitudinal axis of said vehicle, means forming a driving connection between said rocking lever and said crank shaft, vehicle propelling wheels carried by said axle, and means forming a driving connection between said axle and said wheels.

2. In a toy vehicle, a front wheel drive unit comprising a supporting structure including a vertically disposed post, an axle journaled in said structure, a crank power shaft journaled in said structure, a gear fixed on said shaft, a pinion on said axle and meshed with said gear, a hand operated rocking lever mounted adjacent the upper end of said post for a rocking movement about a movable fulcrum point, said fulcrum point being movable back and forth in a direction parallel with the longitudinal axis of said vehicle, means forming a driving connection between said rocking lever and said crank shaft, vehicle propelling wheels carried by said axle, and means forming a driving connection between said axle and said wheels.

3. In a toy vehicle, a front wheel drive unit comprising a supporting structure including a vertically disposed post, an axle journaled in said structure, a crank power shaft journaled in said structure, a gear fixed on said shaft, a pinion on said axle and meshed with said gear, a hand operated rocking lever mounted adjacent the upper end of said post for a rocking movement about a movable fulcrum point, said fulcrum point being movable back and forth in a direction parallel with the longitudinal axis of said vehicle a substantially inverted U-shaped connecting rod member having its ends pivotally connected to the opposite ends of said crank shaft and having its upper end mounted in pivoted supporting brackets carried by said post, a drive head carried by the forward end of said rocking lever and having a forwardly vertically flared opening therein in which the closed upper end of said connecting rod member is mounted, said opening terminating at its rear end in a relatively narrow slot and flaring forwardly and vertically to a width greater than the maximum stroke of said connecting rod whereby said connecting rod will be forced to enter said slot to form a driving connection with said rocking lever when said fulcrum is moved forward and said connecting rod will be positioned in said flared portion of said opening for free movement relative to said lever when said fulcrum is moved to its rear position, and vehicle propelling wheels carried by said axle.

4. In a toy vehicle, a self contained hand operated front wheel drive unit including a crank power shaft, a rocking lever having a movable fulcrum point, a connecting rod member connecting said lever and said shaft, and means forming a drive connection between said lever and said rod member when said lever is moved to the forward limit of its movable fulcrum and for drive connection inoperative when said lever is moved to the rear limit of its movable fulcrum.

5. A toy vehicle comprising in combination a wheeled body unit, and a self contained hand operated front wheel drive unit, a pair of horizontally disposed spaced coupler jaws carried by one of said units, a horizontally disposed tongue carried by the other of said units and mounted between said jaws, and a coupling pin removably mounted in said jaws and said tongue to connect said units together.

6. In a toy vehicle, a front wheel drive unit comprising a supporting structure, an axle journaled in said structure, a crank power shaft journaled in said structure, a gear on said crank shaft, a pinion on said axle and meshed with said gear, a hand operated rocking lever mounted adjacent the upper end of said supporting structure, connecting rods connected to said rocking lever and said crank shaft, vehicle propelling wheels journaled on said axle and cooperating means carried by said propelling wheels and said axle and engaging each other to form a drive connection between said wheels and said axle, said means being disengageable to permit a limited rotation of said wheels relative to each other.

7. A toy vehicle comprising a wheeled body unit and a self contained hand propelled front wheel drive unit pivotally connected to said body unit, said drive unit comprising a supporting structure including a post, an axle journaled in said structure, a crank power shaft journaled in said structure, a gear on said crank shaft, a pinion on said axle and meshed with said gear, a hand operated rocking lever mounted at the upper end of said post, connecting rods connected to said rocking lever and said crank shaft, vehicle propelling wheels journaled on said axle, and cooperating means carried by said propelling wheels and said axle and engaging each other to form a drive connection between said wheels and said axle, said means being disengageable to permit a limited rotation of said wheels relative to each other.

8. In a toy vehicle, a self contained hand operated front wheel drive unit including a power shaft, an axle, gearing connecting said shaft and said axle, wheels carried by said axle, and cooperating means carried by said propelling wheels and said axle and engaging each other to form a drive connection between said wheels and said axle, said means being disengageable to permit a limited rotation of said wheels relative to each other.

In testimony whereof I have hereunto set my hand.

JAMES E. HESTER.